United States Patent
Neul et al.

(10) Patent No.: US 9,261,363 B2
(45) Date of Patent: Feb. 16, 2016

(54) YAW RATE SENSOR

(75) Inventors: Reinhard Neul, Stuttgart (DE);
Johannes Classen, Reutlingen (DE);
Axel Franke, Ditzingen (DE); Marco Quander, Gerlingen (DE); Joerg Hauer, Reutlingen (DE); Udo-Martin Gomez, Leonberg (DE); Kersten Kehr, Zwota (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1575 days.

(21) Appl. No.: 12/303,443

(22) PCT Filed: Jun. 6, 2007

(86) PCT No.: PCT/EP2007/055597
§ 371 (c)(1),
(2), (4) Date: May 15, 2009

(87) PCT Pub. No.: WO2008/015044
PCT Pub. Date: Feb. 7, 2008

(65) Prior Publication Data
US 2010/0000321 A1    Jan. 7, 2010

(30) Foreign Application Priority Data

Jul. 31, 2006 (DE) .......... 10 2006 035 281
Oct. 5, 2006 (DE) .......... 10 2006 047 135

(51) Int. Cl.
*G01C 19/56* (2012.01)
*G01C 19/5762* (2012.01)
*G01C 19/5747* (2012.01)

(52) U.S. Cl.
CPC ........ *G01C 19/5762* (2013.01); *G01C 19/5747* (2013.01)

(58) Field of Classification Search
USPC .............................. 73/504.04, 504.12, 504.14
See application file for complete search history.

(56) References Cited

U.S. PATENT DOCUMENTS

| 6,349,597 | B1  |   | 2/2002 | Folkmer et al. |
| 6,705,164 | B2  | * | 3/2004 | Willig et al. ............... 73/504.12 |
| 6,928,873 | B2  | * | 8/2005 | Chen et al. ................ 73/504.04 |
| 2004/0154398 | A1 |   | 8/2004 | Willig et al. |

FOREIGN PATENT DOCUMENTS

| DE | 4032559     | 4/1992  |
| DE | 10059774    | 6/2001  |
| DE | 10101561    | 7/2001  |
| DE | 102 03 515  | 8/2003  |
| EP | 1 098 170   | 5/2001  |
| EP | 1170573     | 1/2002  |
| EP | 1 365 211   | 11/2003 |
| JP | 2000-9472   | 1/2000  |
| JP | 2000-97708  | 4/2000  |
| JP | 2001-21360  | 1/2001  |
| WO | WO 02/066927 | 8/2002 |

OTHER PUBLICATIONS

International Search Report, PCT/EP2007/055597, dated Sep. 21, 2007.

* cited by examiner

*Primary Examiner* — John Chapman, Jr.
(74) *Attorney, Agent, or Firm* — Kenyon & Kenyon LLP

(57) ABSTRACT

A yaw rate sensor includes a drive mass element which is situated above a surface of a substrate and is drivable to vibrate by a drive device along a first axis extending along the surface, having a detection mass element, which is deflectable under the influence of a Coriolis force along a second axis perpendicular to the surface, and having a detection device by which the deflection of the detection mass element along the second axis is detectable. Due to the arrangement of the second axis perpendicular to the surface, the yaw rate sensor may be integrated into a chip together with additional yaw rate sensors suitable for detection of rotations about axes of rotation in other directions.

11 Claims, 3 Drawing Sheets

YAW RATE SENSOR

FIELD OF THE INVENTION

The present invention relates to a yaw rate sensor.

BACKGROUND INFORMATION

Such a yaw rate sensor, which is described in DE 102 03 515, has a drive mass element situated above a surface of a substrate and drivable to vibrate by a drive device along a first axis extending parallel to the surface, a detection mass element deflectable along a second axis extending perpendicular to the first axis under the influence of a Coriolis force and a detection device by which the deflection of the detection mass element along the second axis is detectable.

The Coriolis force is transmitted by springs from the drive mass element to the detection mass element and the second axis also extends along the surface of the substrate. The yaw rate sensor is thus suitable for detection of a Coriolis force, which occurs due to rotation about an axis perpendicular to the surface of the substrate. For detection of the Coriolis force, several fingers which engage in corresponding fingers formed on the substrate are designed as electrodes on the detection mass element. The change in capacitance between the fingers is used to determine the Coriolis force.

SUMMARY

Example embodiments of the present invention provide a yaw rate sensor which is arranged to detect a Coriolis force directed perpendicular to the substrate and thus a corresponding rotation about an axis extending along the surface of the substrate.

According to example embodiments of the present invention, the second axis extends perpendicular to the surface.

A yaw rate sensor may advantageously be created having dimensions that are unusual with respect to the direction of the axis of rotation. The yaw rate sensor may in particular then be integrated into a vehicle in a space-saving manner. The yaw rate sensor may also be integrated into a chip together with other yaw rate sensors suitable for detection of rotation about axes of rotation directed in other directions. The yaw rate sensor is also designed for high working frequencies, so that the influence of interfering accelerations is reduced. Instead of a drive mass element, two or more drive mass elements may also be provided. Instead of a drive device, two or more drive devices may also be provided.

Example embodiments provide another drive mass element which is situated above the surface and is drivable by another drive device along the first axis, another detection mass element which is deflectable under the influence of the Coriolis force along the second axis extending perpendicular to the surface and another detection device by which the deflection of the additional detection mass element along the second axis is detectable.

In this manner, a particularly sensitive yaw rate sensor may be created. Instead of an additional drive mass element, two or more additional drive mass elements may also be provided. Instead of one additional drive device, two or more additional drive devices may also be provided. The following example embodiments and refinements also further increase the sensitivity.

In example embodiments, the drive mass element is connected to the substrate by at least one drive mass spring which is arranged so that vibrations of the drive mass element in any direction perpendicular to the first axis are suppressed and the additional drive mass element is connected to the substrate by at least one additional drive mass spring, which is arranged such that vibrations of the additional drive mass element in any direction perpendicular to the first axis are suppressed.

In example embodiments, the drive mass element is connected to the detection mass element by at least one detection mass spring, which is arranged such that vibrations of the detection mass element relative to the drive mass element in any direction perpendicular to the second axis are suppressed and the additional drive mass element is connected to the additional detection mass element by at least one additional detection mass spring, which is arranged such that vibrations of the additional detection mass element relative to the additional drive mass element in any direction perpendicular to the second axis are suppressed.

In example embodiments, one vibration mass element and an additional vibration mass element are provided, the drive mass element being connected to the vibration mass element by at least one vibration mass spring, the additional drive mass element being connected to the additional vibration mass element by at least one additional vibration mass spring, the vibration mass element being connected to the detection mass element by at least one detection mass spring and the additional vibration mass element being connected to the additional detection mass element by at least one additional detection mass spring.

The Coriolis force is advantageously transmitted only to the detection mass elements, while the detection mass elements rest along the surface of the substrate. The vibration mass element and the additional vibration mass element are preferably coupled to one another by at least one coupling spring, and in the resting position, the centers of gravity of the drive mass element, the vibrating element, the detection mass element, the additional drive mass element, the additional vibration element and the additional detection mass element coincide.

In example embodiments, the detection mass element and the additional detection mass element are coupled to one another by at least one coupling spring.

In example embodiments, the drive mass element and the additional drive mass element are coupled to one another by at least one coupling spring.

In an example embodiment, the centers of gravity of the drive mass elements and the detection mass elements coincide in the resting position.

Advantageously, corruption of the measuring results due to circular acceleration about the second axis is thereby prevented. The interference sensitivity and transverse sensitivity are thus greatly improved.

Example embodiments of the present invention are described in greater detail below with reference to the drawings.

DETAILED DESCRIPTION

Figure 1:
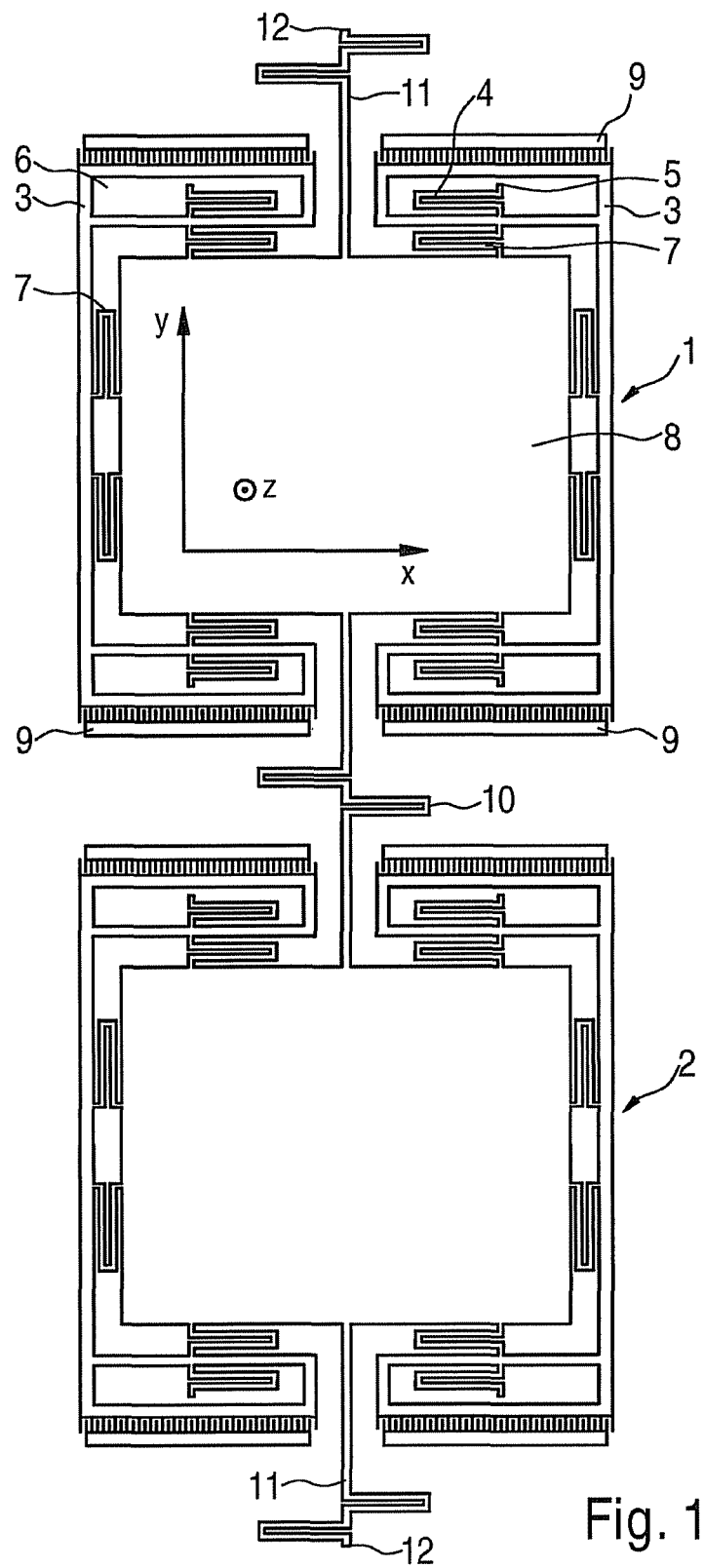
FIG. 1 shows a view of a yaw rate sensor.

FIG. 1 shows a view of a yaw rate sensor. The yaw rate sensor includes two identical structures 1, 2 having a constant thickness over a substrate extending in the plane of the paper. Structures 1, 2, for example, are created by deposition of a polysilicon layer on an oxide surface, which is in turn provided on a silicon substrate. Recesses are formed in the oxide layer, so that the polysilicon layer is bonded to the silicon substrate. These structures are then defined and the oxide layer is removed in an etching process. The polysilicon layer remains bonded to the silicon substrate.

Each structure 1, 2 has two drive mass elements 3. Drive mass elements 3 are connected to the underlying substrate at ends 5 of drive mass springs 4 by four drive mass springs 4. Two drive mass springs 4 connecting same drive mass element 3 to the underlying substrate are in opposition in a y direction extending along the surface of the substrate. The position of drive mass element 3 is thus limited in the y direction between two ends 5 relative to the underlying substrate. Drive mass springs 4 are each situated in a rectangular recess 6 in one of drive mass elements 3. Drive mass springs 4 are extendable mainly in the y direction because of the alignment of their folds, while vibrations of drive mass elements 3 in the x direction are suppressed. Since drive mass springs 4 are attached in recesses 6, there remains enough space on the sides of drive mass elements 3 to provide comb drives 9, with which drive mass elements 3 may be induced to vibrate in the y direction.

Two drive mass elements 3 of each structure 1, 2 are connected to a rectangular detection mass element 8 (two on each side) via eight detection mass springs 7. Detection element 8 may be provided with continuous holes (e.g., perforation). Two drive mass elements 3 almost completely surround detection mass element 8 but leave enough space to connect a coupling spring 10 and a substrate spring 11 to detection mass element 8. Two detection mass springs 7 are mounted on two opposite sides of detection mass element 8. Due to the design and this mounting of detection mass springs 7, vibrations of detection mass element 8 relative to drive elements 3 in the x and y directions are suppressed, while a relative movement of detection mass element 8 in a z direction perpendicular to the surface is readily possible.

Detection mass elements 8 are coupled together via coupling spring 10. Detection mass elements 8 are connected for stabilization to the underlying substrate via substrate springs 11 at ends 12 of substrate springs 11.

Figure 2:
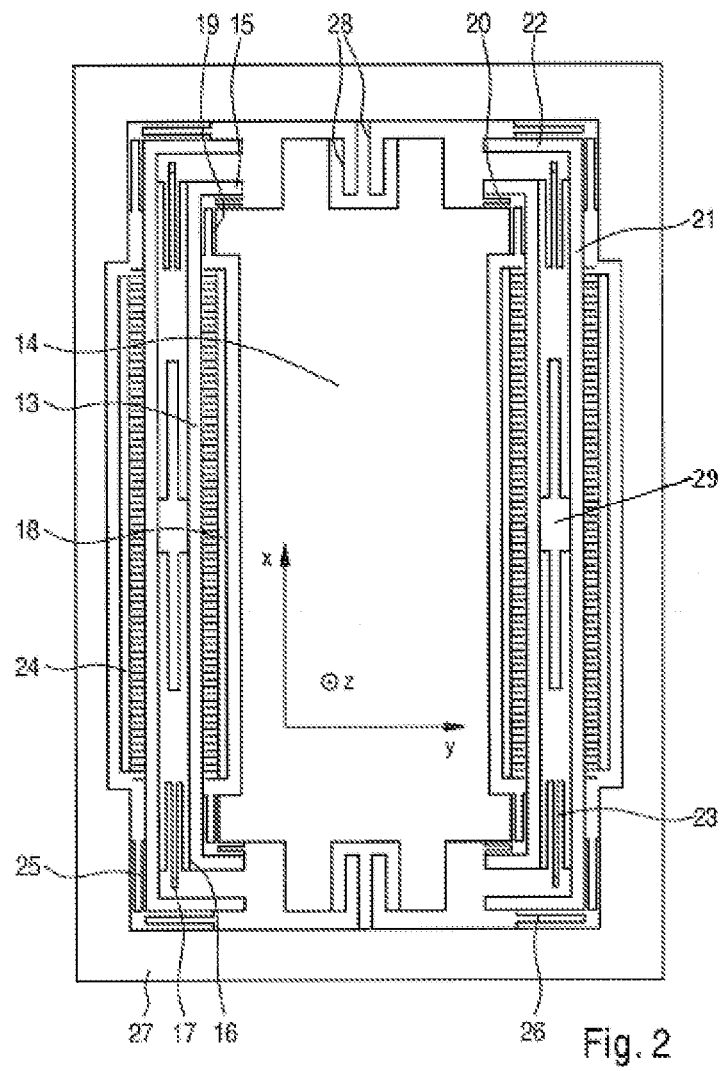
FIG. 2 shows a view of an additional yaw rate sensor.

FIG. 2 shows a view of another yaw rate sensor, which may be manufactured by the same method as the yaw rate sensor described above. The additional yaw rate sensor also has substantially the same function. For the sake of simplicity all springs are shown as lines in FIG. 2.

Two drive mass elements 13 are situated on two opposite sides of a detection mass element 14 having a substantially rectangular shape. These two drive mass elements 13 each have a laterally protruding projection 15 on their two opposing ends, so that detection mass element 14 is enclosed by drive mass elements 13 in the manner of a clamp.

Two drive mass elements 13 are connected to an underlying substrate at their ends 17 via two drive mass springs 16 on one end each. On the opposite sides, fingers formed on drive mass elements 13 engage in the fingers of comb drives 18. Because of this arrangement and the design of drive mass springs 16, vibrations in the x direction are suppressed, while vibrations in the y direction perpendicular to the x direction along the surface of the substrate may develop easily.

Two drive mass elements 13 are connected via eight detection mass springs 19, 20 to detection mass element 14. Two detection mass springs 19, 20 are accommodated opposite one another on the two sides of detection mass element 14. Protrusions 15 function to position detection mass springs 20. Due to the design and mounting of detection mass springs 19, 20, vibrations in detection mass element 14 relative to drive elements 13 in the x and y directions are suppressed, while a relative movement of detection mass element 14 in a z direction perpendicular to the surface is readily possible.

An additional drive mass element 21 is situated parallel outside each drive mass element 13. Two drive mass elements 21 each have a laterally protruding projection 22 on their two opposing ends, so that drive mass elements 13 are enclosed by additional drive mass elements 21 in the manner of a clamp. Two additional drive mass elements 21 are connected to the underlying substrate on one side, each via additional drive mass springs 23 on their ends 17 which they share with drive mass springs 17. On opposing sides, fingers formed on additional drive mass elements 21 engage in the fingers of comb drives 24. Because of this arrangement and the design of drive mass springs 23, vibrations in the x direction are suppressed while vibrations in the x direction perpendicular to the y direction along the surface of the substrate may develop easily.

Two additional drive mass elements 21 are connected via eight detection mass springs 25, 26 to an additional detection mass element 27 designed substantially as a rectangle having a rectangular recess. Detection mass element 14, drive elements 13 and drive elements 21 are situated in the recess. This structure having additional detection mass element 27 as a surrounding frame results in a high stability. Two detection mass springs 25, 26 are mounted opposite one another on two sides of detection mass element 27. Protrusions 22 function to position detection mass springs 26. Due to the design and this mounting of detection mass springs 25, 26, vibrations of detection mass element 27 relative to drive mass elements 21 in the x and y directions are suppressed, while a relative movement of detection mass element 27 in the z direction perpendicular to the surface is readily possible.

Detection mass elements 14, 17 are coupled to one another by coupling springs 28. The drive mass elements are coupled to one another via coupling springs 29.

Because of the symmetrical design of the additional yaw rate sensor, the centers of gravity of drive mass elements 13, detection mass element 14, additional drive mass elements 21 and additional detection mass element 27 coincide in the resting position, so that corruption of the measuring results due to a circular acceleration about the second axis is prevented.

As a result of the drive mass elements and detection mass elements being made of polysilicon, they are electrically conducting, as is necessary for the analysis. In particular the number of springs and drive mass elements and comb drives is arbitrary. The number of folds in the springs is optional. The springs are preferably designed with the same thickness to increase the insensitivity to manufacturing tolerances. However, it is of great importance how the drive mass elements and detection mass elements move relative to one another and to the substrate. The detection mass elements may each also be completely surrounded by a drive mass element so that the two drive mass elements are coupled to one another by a coupling spring. The inverse arrangement of the detection mass elements and drive mass elements is also possible. Such a boundary structure of the drive mass elements and detection mass elements increases stability.

To detect rotation about the x axis, the drive mass elements for all example embodiments are excited by the comb drives to vibrate along the y axis. The Coriolis force is then directed in the z direction perpendicular to the surface of the substrate. The frequency of the comb drives is preferably selected so that the detection mass elements are excited to opposite phase vibrations due to the coupling. An electrode is preferably designed as a detection device in the substrate beneath the detection mass elements. If the detection mass elements are induced by the Coriolis force to vibration in the z direction, the capacitances between the electrodes change relative to the detection mass elements above them. By forming the difference in the signals from the electrodes, interference accelerations may be subtracted easily. Furthermore, suitable dimensioning of the drive mass elements and detection mass elements ensures that their common center of gravity is invariant over time.

Figure 3:
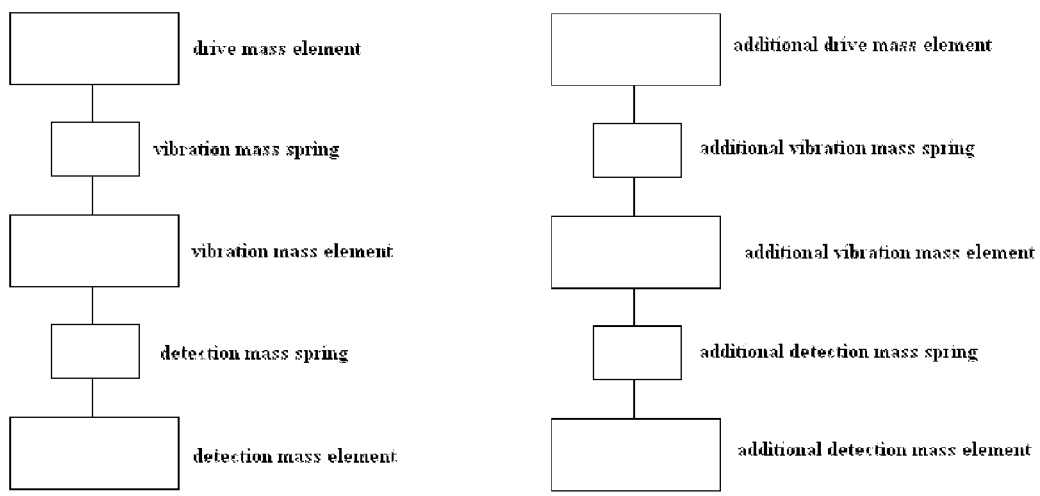
FIG. 3 shows a diagram of an additional yaw rate sensor.

Additional vibration mass elements which are coupled to one another may also be provided between the drive mass elements and the detection mass elements as shown in FIG. 3. It is thus possible to transmit only the vibration in the z direction due to the Coriolis force to the detection mass elements.

What is claimed is:

1. A yaw rate sensor, comprising:
   a drive mass element arranged above a surface of a substrate and drivable to vibrate by a drive device along a first axis extending along the surface;
   a detection mass element deflectable along a second axis under the influence of a Coriolis force;
   a detection device adapted to detect deflection of the detection mass element along the second axis;
   an additional drive mass element arranged above the surface and drivable by an additional drive device along the first axis;
   an additional detection mass element deflectable under the influence of the Coriolis force along the second axis extending perpendicular to the surface; and
   an additional detection device adapted to detect deflection of the additional detection mass element along the second axis,
   wherein the second axis extends perpendicular to the surface,
   wherein the drive mass element is directly connected to the substrate by at least one drive mass spring,
   wherein a vibration mass element and an additional vibration mass element are provided, the drive mass element is connected to the vibration mass element by at least one vibration mass spring, the additional drive mass element is connected to the additional vibration mass element by at least one additional vibration mass spring, the vibration mass element is connected to the detection mass element by at least one detection mass spring, and the additional vibration mass element is connected to the additional detection mass element by at least one additional detection mass spring.

2. The yaw rate sensor according to claim 1, wherein the at least one drive mass spring is arranged such that vibrations of the drive mass element in any direction perpendicular to the first axis are suppressed, and the additional drive mass element is connected to the substrate by at least one additional drive mass spring arranged such that vibrations of the additional drive mass element in any direction perpendicular to the first axis are suppressed.

3. The yaw rate sensor according to claim 1, wherein the drive mass element is connected to the detection mass element by at least one detection mass spring arranged such that vibrations of the detection mass element relative to the drive mass element in any direction perpendicular to the second axis are suppressed; and the additional drive mass element is connected to the additional detection mass element by at least one additional detection mass spring arranged such that vibrations of the additional detection mass element relative to the additional drive mass element are suppressed in any direction perpendicular to the second axis.

4. The yaw rate sensor according to claim 1, wherein the vibration mass element and the additional vibration mass element are coupled to one another by at least one coupling spring.

5. The yaw rate sensor according to claim 4, wherein centers of gravity of the drive mass element, the vibration mass element, the detection mass element, the additional drive mass element, the additional vibration mass element and the additional detection mass element coincide in a resting position.

6. The yaw rate sensor according to claim 1, wherein the drive mass element and the additional drive mass element are coupled to one another by at least one coupling spring.

7. A yaw rate sensor, comprising:
   a drive mass element arranged above a surface of a substrate and drivable to vibrate by a drive device along a first axis extending along the surface;
   a detection mass element deflectable along a second axis under the influence of a Coriolis force;
   a detection device adapted to detect deflection of the detection mass element along the second axis;
   an additional drive mass element arranged above the surface and drivable by an additional drive device along the first axis;
   an additional detection mass element deflectable under the influence of the Coriolis force along the second axis extending perpendicular to the surface; and
   an additional detection device adapted to detect deflection of the additional detection mass element along the second axis,
   wherein the second axis extends perpendicular to the surface,
   wherein the drive mass element is directly connected to the substrate by at least one drive mass spring,
   wherein the detection mass element and the additional detection mass element are coupled to one another by at least one coupling spring.

8. The yaw rate sensor according to claim 7, wherein the at least one drive mass spring is arranged such that vibrations of the drive mass element in any direction perpendicular to the first axis are suppressed, and the additional drive mass element is connected to the substrate by at least one additional drive mass spring arranged such that vibrations of the additional drive mass element in any direction perpendicular to the first axis are suppressed.

9. The yaw rate sensor according to claim 7, wherein the drive mass element is connected to the detection mass element by at least one detection mass spring arranged such that vibrations of the detection mass element relative to the drive mass element in any direction perpendicular to the second axis are suppressed; and the additional drive mass element is connected to the additional detection mass element by at least one additional detection mass spring arranged such that vibrations of the additional detection mass element relative to the additional drive mass element are suppressed in any direction perpendicular to the second axis.

10. The yaw rate sensor according to claim 7, wherein the drive mass element and the additional drive mass element are coupled to one another by at least one coupling spring.

11. A yaw rate sensor, comprising:
    a drive mass element arranged above a surface of a substrate and drivable to vibrate by a drive device along a first axis extending along the surface; a detection mass element deflectable along a second axis under the influence of a Coriolis force; and a detection device adapted to detect deflection of the detection mass element along the second axis; wherein the second axis extends perpendicular to the surface;

an additional drive mass element arranged above the surface and drivable by an additional drive device along the first axis; an additional detection mass element deflectable under the influence of the Coriolis force along the second axis extending perpendicular to the surface; and an additional detection device adapted to detect deflection of the additional detection mass element along the second axis;

wherein the detection mass element and the additional detection mass element are coupled to one another by at least one coupling spring, wherein centers of gravity of the drive mass elements and the detection mass elements coincide in a resting position.

* * * * *